US009369037B2

(12) United States Patent
Lenz et al.

(10) Patent No.: US 9,369,037 B2
(45) Date of Patent: Jun. 14, 2016

(54) STEP-UP CONVERTER HAVING TWO RECIPROCALLY CLOCKED SWITCHES

(75) Inventors: Thomas Lenz, Bad Homburg (DE);
Stefan Heimfarth, Waldsolms (DE);
Peter Knaup, Zwingenberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 233 days.

(21) Appl. No.: 14/124,770

(22) PCT Filed: Jun. 6, 2012

(86) PCT No.: PCT/EP2012/060768
§ 371 (c)(1),
(2), (4) Date: Mar. 4, 2014

(87) PCT Pub. No.: WO2012/168338
PCT Pub. Date: Dec. 13, 2012

(65) Prior Publication Data
US 2015/0295491 A1    Oct. 15, 2015

(30) Foreign Application Priority Data

Jun. 7, 2011    (DE) .................... 20 2011 102 068 U

(51) Int. Cl.
*H02M 3/158*    (2006.01)
*H02M 7/42*     (2006.01)
(Continued)

(52) U.S. Cl.
CPC ................. *H02M 3/04* (2013.01); *H02J 3/383* (2013.01); *H02M 3/158* (2013.01); *H02M 7/42* (2013.01); *H02M 7/48* (2013.01); *Y02E 10/563* (2013.01)

(58) Field of Classification Search
CPC ..... H02M 7/487; H02M 1/10; H02M 1/4225; H02M 3/33569; H02M 7/53803; H02M 3/02; H02M 3/03; H02M 3/22; H02M 7/42; H02M 7/44; H02M 2007/4835
See application file for complete search history.

(56) References Cited

U.S. PATENT DOCUMENTS

| 7,839,665 B2 | 11/2010 | Toba et al. | |
| 8,116,103 B2* | 2/2012 | Zacharias | H02M 7/48 363/132 |

(Continued)

FOREIGN PATENT DOCUMENTS

| DE | 10 2004 037 446 | 6/2006 |
| EP | 1 887 672 | 2/2008 |

(Continued)

OTHER PUBLICATIONS

International Search Report, PCT International Application No. PCT/EP2012/060768, dated Jun. 28, 2013.

(Continued)

*Primary Examiner* — Adolf Berhane
*Assistant Examiner* — Henry Lee, III
(74) *Attorney, Agent, or Firm* — Norton Rose Fulbright US LLP

(57) ABSTRACT

A step-up converter for stepping up an electrical input DC supply voltage to an electrical output DC supply voltage, including a voltage input having a positive and a negative input node, a voltage output having a positive and negative output node, a first and second output capacitor connected in series at the voltage output between the positive and negative output nodes and connected to one another via a center output node, and a first inductor connected between the positive and output nodes, a first switch, connected between the first inductor and the center output node, a second inductor connected between the negative output and negative input nodes, a second switch, connected between the center output node and the second inductor, and a total input capacitor, connected at the voltage input between the positive and negative input voltage nodes, the first and second inductors being inductively coupled to one another.

10 Claims, 4 Drawing Sheets

(51) Int. Cl.
*H02M 3/04* (2006.01)
*H02J 3/38* (2006.01)
*H02M 7/48* (2007.01)

(56) References Cited

U.S. PATENT DOCUMENTS

2009/0085537 A1* 4/2009 Nakabayashi ........ H02M 3/158
  323/273
2014/0017521 A1 1/2014 Suzuki

FOREIGN PATENT DOCUMENTS

EP 2 001 111 12/2008
EP 2 244 367 10/2010
JP 09-140157 5/1997

OTHER PUBLICATIONS

Zhang et al., "Single-Phase Three-Level Boost Power Factor Correction Converter," *Applied Power Electronics Conference and Exposition*, 1995.

* cited by examiner

US 9,369,037 B2

STEP-UP CONVERTER HAVING TWO RECIPROCALLY CLOCKED SWITCHES

FIELD

The present invention relates to a step-up converter for stepping up an electrical input DC supply voltage to an electrical output DC supply voltage. The present invention further relates to an inverter assembly having a step-up converter and a solar array having a step-up converter. The present invention further relates to a method for operating a step-up converter.

BACKGROUND INFORMATION

Step-up converters are used to step up an electrical DC supply voltage having a first voltage amplitude to an electrical DC supply voltage having a second voltage amplitude so that the second voltage amplitude is higher than the first voltage amplitude. This is used in particular in conjunction with solar generators and inverters for supplying energy produced by the solar generator to an electrical AC grid. The solar generator, i.e., an array of at least one, usually multiple photovoltaic cells, generates an electrical DC supply voltage which it supplies. The voltage amplitude thereof may fluctuate, in particular depending on the temperature. An inverter generates an AC current from a DC supply voltage, namely, an intermediate circuit voltage, for example, with the aid of a pulse-width modulation technique, for a feed to an AC grid. This requires a voltage amplitude that corresponds to the voltage in the AC grid and for this the intermediate circuit voltage must have a correspondingly higher voltage. This is achieved with the step-up converter, which steps up the voltage supplied by the solar generator to the intermediate circuit voltage.

Simply put, a step-up converter functions in such a way that by closing a switch, a current is generated which flows from the input side of the step-up converter, i.e., in the case of the aforementioned solar application, from the solar generator through an inductance, usually referred to in this context as "inductor," and through the switch. If the switch is opened, the inductance attempts initially to channel the current further, and the step-up converter is designed so that this current is routed to the output voltage side, where it charges a capacitor, namely, an intermediate circuit condenser, or an intermediate circuit capacitor. Hence, such inductance is an important component for the step-up converter, and for satisfactory functionality, this inductance must be of a certain size in order to be able to channel the said current for a certain period of time. The inductor in this case is often the most expensive component of the step-up converter; it often takes up a not inconsiderable amount of physical space and, moreover, is usually the heaviest component in terms of weight.

German Patent Application No. DE 10 2004 037 446 A1 describes an inverter having a step-up converter which provides a breakdown of the inductor into two smaller individual inductors.

A somewhat different type of step-up converter is described in the publication by Zhang et al: "Single-Phase Three-Level Boost Power Factor Correction Converter" at the Applied Power Electronics Conference and Exposition, 1995 (APEC '95), conference proceedings 1996, 10th annual. Here, FIG. 1 shows a specific embodiment which uses only one inductor. The step-up converter shown in this case has a split intermediate circuit capacitor with a first and a second intermediate circuit capacitor connected in series. Provided in this configuration are two switches with which the first and the second intermediate circuit capacitor may in principle be activated individually and, therefore, the voltage of each may be stepped up separately from one another.

Japanese Patent Application No. JP 09140157 A describes a very similar circuit. A step-up converter having a split intermediate circuit and multiple semiconductor switches as well as multiple inductors is described in European Patent Application No. EP 2 244 367 A1. U.S. Pat. No. 7,839,665 B2 also relates to a system having a step-up converter and an inverter, and specifically to overvoltage protection and undervoltage protection.

These and other step-up converters nevertheless require mostly relatively large inductive components and in isolated operation or in the event of unbalanced loads in the grid are also not suited or not well suited for balancing the intermediate circuit of a three-point inverter connected downstream.

General note is made of the U.S. Published Application 2009/0085537 A1.

In accordance with the present invention, an approach is provided which improves balancing characteristics, reduces the use of components, in particular with regard to costs and/or improves the quality of a step-up converter. At least an alternative approach is provided.

According to an example embodiment of the present invention, a step-up converter is provided. The converter is designed for stepping up an electrical input DC supply voltage to an electrical output DC supply voltage. The step-up converter includes a voltage input having a positive and a negative input node at which the input voltage is applied. Also provided is a voltage output which includes a positive and a negative output node. Provided between these nodes is the output voltage. Accordingly, the voltage amplitude of the input voltage, i.e., the input DC supply voltage, is lower than the output voltage, i.e., the output DC supply voltage.

Provided at the voltage output is an output capacitor means which is divided into a first and a second output capacitor means. This first and second output capacitor is interconnected in series between the positive and the negative output nodes and includes a center output node to which the two output capacitor means are actively connected. The first output capacitor means, namely, in particular a first capacitor, in particular a first intermediate circuit capacitor, is interconnected between the positive output node and the center output node. Accruing across this during operation of the step-up converter is a first partial output voltage. Similarly, the second output capacitor means, in particular a second output capacitor, in particular a second intermediate circuit capacitor, is interconnected between the center output node and the negative output node, and accruing across this is a second partial output voltage. The sum of the first and the second partial output voltages constitutes the output voltage or output DC supply voltage between the positive and the negative output nodes.

A total input capacitor means is provided at the voltage input between the positive and negative input nodes.

To operate the step-up converter, a first inductor together with a first switching means is provided, in particular a switch, in particular a semiconductor switch. The first inductor is provided between the positive input node and the positive output node, i.e., in a positive branch, and it is also connected or interconnected with the center output node via the first switching means. Similarly, a second inductor is provided for the negative branch between the negative output node and the negative input node, and connected via a second switching means, which may also be configured as a switch or semiconductor switch, to the center output node.

The step-up converter described may also be referred to as a three-point step-up converter. It executes a voltage step up from voltage input to voltage output, three voltage potentials being present at the voltage output, namely at the positive and negative output nodes and at the center output node, which may be specifically acted upon by the step-up converter.

It is provided that the first and the second inductor are inductively coupled to one another. The two inductors are coupled to one another preferably by the use of a shared core. By alternate clocking of the first and the second switching means or the first and second switch at high input voltages which are higher than half the output voltage provided, it is possible to step up the input voltage to the output voltage. The advantageous effect is that a counter voltage of half the output voltage is present during magnetization of the first and second inductor, thereby reducing a current ripple. A further advantage exists in the reciprocal clocking of the two switches, i.e., in alternately turning the switches on and off, resulting in a doubling of the visible switching frequency at the inductors. These cited effects together may be utilized to a significant reduction, for example, in the range of 50% or more, of the total inductivity of the first and second inductor as compared to a conventional step-up approach, as is described, for example, in German Patent Application No. DE 10 2004 037 466 A1.

At low input voltages, when the input voltage is lower than half the output voltage provided, the switching states may be changed in such a way that clocking, i.e., the switching of the first and second switching means, occurs in such a way that both switching means are closed, in each case temporarily, at the same time. At a high input voltage, clocking may occur in such a way that both switching means are temporarily overlappingly opened. The cited advantages of reciprocal clocking are, in principle, given in both cases, i.e., at high and low input voltages.

Preferably, the total input capacitor means is divided into a first and second input capacitor means, in particular a first and second input capacitor is provided as first and second input capacitor means. Thus, these two input capacitors are connected in series at the voltage input and include a center input node to which they are connected. For reasons of simplification, but not to be understood as limiting, the term "first and second output capacitor" is used to denote the first and second output capacitor means and "first and second input capacitor" to denote the first and second input capacitor means.

In this specific example embodiment, the center input node and center output node are connected to one another and, accordingly, have the same voltage potential. By coupling the center input nodes to the center output node and preferably to a ground connection or a PE connection, operation-related leakage currents may be significantly reduced. This includes in particular leakage currents as a result of capacitive coupling of the solar generators to ground.

With the specific example embodiment which provides a first and second input capacitor means and therefore a center input node connected to the center output node, it is possible to combine the advantages of an inductive coupling of the first and second inductor with the advantages of using a capacitive coupling of the input voltage to ground or to the center output node. Coupling the inductors provides the possibility of exchanging energy of the first input capacitor means with the second output capacitor means and vice versa. Here as well, it is possible to reduce the operation-related leakage currents by capacitive coupling of the input voltage or input voltage source to ground or to the center output node.

It is beneficial if the center output node and, therefore if necessary, the center input node is grounded. This results in a capacitive coupling in particular of the input voltage to ground. Such a coupling to ground may be significant, particularly in the use of solar generators as input voltage sources which, in principle, may cause high leakage currents as a result of capacitive effects.

Preferably, the step-up converter has a basically symmetrical structure in that the first and second output capacitor means and/or the first and second inductors and/or the first and second input capacitor means are all the same size. In other words, the output capacitor may be divided into two capacitors of equal size, in particular a first and a second so-called intermediate circuit capacitor of equal size, namely, of equal capacitance. The same applies to the two inductors which may have the same inductivity and it is equally provided that both input capacitors have the same capacitance.

Also provided is an inverter assembly for generating an electrical AC current from an electrical DC supply voltage. The inverter assembly includes a step-up converter according to one of the above described specific embodiments. In this assembly, the step-up converter steps up an input voltage to an output voltage. The inverter is provided for generating, in particular, by a modulation method, an AC voltage from the output voltage stepped up by the step-up converter. Thus, in this inverter assembly the output DC supply voltage of the step-up converter constitutes an intermediate circuit voltage which accordingly may be considered an input voltage for the inverter.

Preferably, in this case the center output node is connected to a neutral conductor in the inverter and the inverter therefore generates a DC voltage signal related to the potential of this neutral conductor. Thus, this AC voltage is also related to the potential of the center output node and therefore, if necessary, to the potential of the center input node.

Also provided is a solar array which includes a solar generator for generating electrical energy from light, in particular from sunlight. Such a solar generator is provided for providing an electrical DC supply voltage. Also included is an inverter assembly, in particular as described above, which generates an electrical AC current from the DC supply voltage provided by the solar generator. Thus, a solar array is provided which exploits in particular the advantages of the described step-up converter in an entire system.

Also provided is a method for operating a step-up converter. This method, which in this respect may also be used to operate an inverter assembly as described and accordingly also to operate a solar array, also provides that the step-up converter is activated depending on the input voltage.

If the input DC supply voltage, i.e., in particular the DC supply voltage provided from a solar generator, is higher than a predetermined limiting voltage, namely in particular higher than half the output voltage provided, a reciprocal clocking of the first and second switching means is then provided. As a result, generally the first and second partial output voltages are reciprocally stepped up at the first and second output capacitors. With inductive coupling of the first and second inductors, it is possible to reduce a current ripple and to double the effective switching frequency.

If, however, the input voltage is smaller, clocking may occur in such a way that the first and second switching means are temporarily closed at the same time.

Preferably, it is provided that the step-up converter is activated in such a way that the first and the second capacitor means are continuously or cyclically unequally charged. Such activation is possible due to the topology of the step-up converter described above, because the first and the second capacitor means, namely, in particular a first and second intermediate circuit capacitor, may be activated independently of one another. Unequal charging is understood to mean the situation in which different voltages are set at the first and second capacitor means by the step-up converter.

Because the two capacitor means, i.e., in particular the two intermediate circuit capacitors, have different voltage amplitudes, this makes it possible to account for an unbalanced load condition in the AC voltage grid intended to be fed with the aid of an inverter. Asymmetrical loads or asymmetrical consumers at isolated grids may cause such asymmetry at the grid, namely, an unbalanced load, particularly when the step-up converter is operated together with an inverter at an isolated grid. If necessary, such an unbalanced load may be counteracted by the described unequal charging of the output capacitor means of the step-up converter, and possibly achieve or at least work toward a balancing. An unbalanced load in the grid also often results in an asymmetrical load of the intermediate circuit of the inverter which may be counteracted by the approach provided.

Preferably, the step-up converter is activated in such a way that the first and the second partial output voltages fluctuate counter to one another in order to adjust their amplitude to an AC voltage to be generated. Preferably, the partial output voltages fluctuate in this case in such a way that their sum remains approximately constant. In other words, the voltage between the positive and the negative input nodes remains approximately constant, but its relation to the center output node changes or fluctuates.

As a result, when used with an inverter for feeding an AC voltage grid, a somewhat higher voltage for each voltage amplitude to be generated or current amplitude of the approximately sinusoidal current to be generated may be present at the respective intermediate circuit capacitor, namely, in particular a high voltage at the first output capacitor means, i.e., the first intermediate circuit capacitor for the peak of a positive half wave, and similarly, a high voltage at the second output capacitor means, i.e., the second intermediate circuit capacitor for the peak of a negative half wave. In this way a certain voltage reserve may be provided at the intermediate circuit of the inverter or, if necessary, the total voltage at the intermediate circuit may be permanently lowered. The latter could also influence the dimensioning of the components of the step-up converter and/or of the inverter.

BRIEF DESCRIPTION OF THE DRAWINGS

The prevent invention is explained in greater detail below as represented by exemplary embodiments and with reference to the figures.

DETAILED DESCRIPTION OF EXAMPLE EMBODIMENTS

Figure 1:
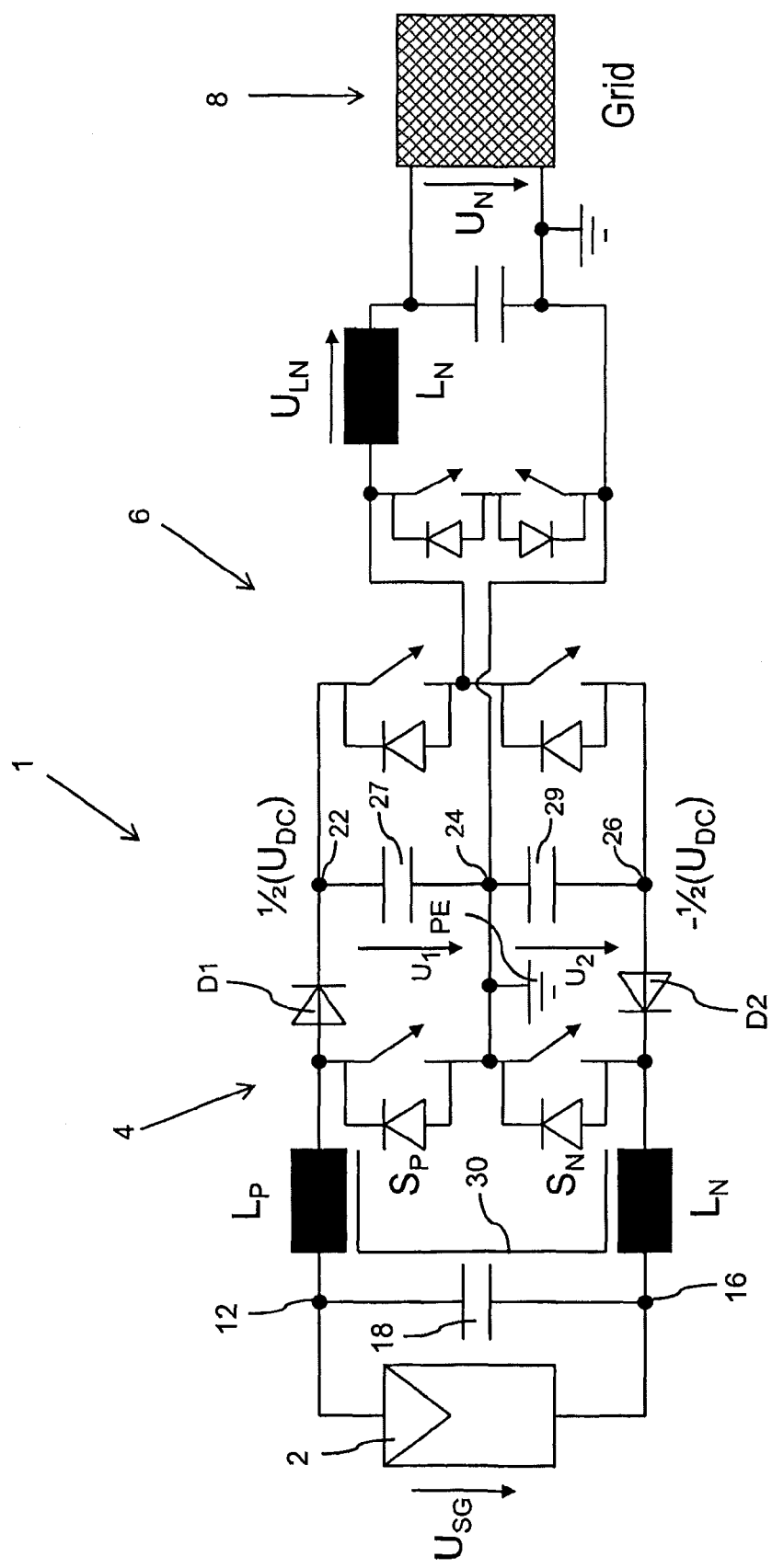
FIG. 1 schematically shows a solar array having a solar generator, a step-up converter and an inverter according to one specific embodiment.

Where necessary, identical reference numerals are also used for similar but not identical elements in order to make clear their functional similarity.

FIG. 1 shows a solar array 1 having a solar generator 2, a step-up converter 4 and an inverter 6. The inverter feeds into an electrical grid 8.

Figure 2:
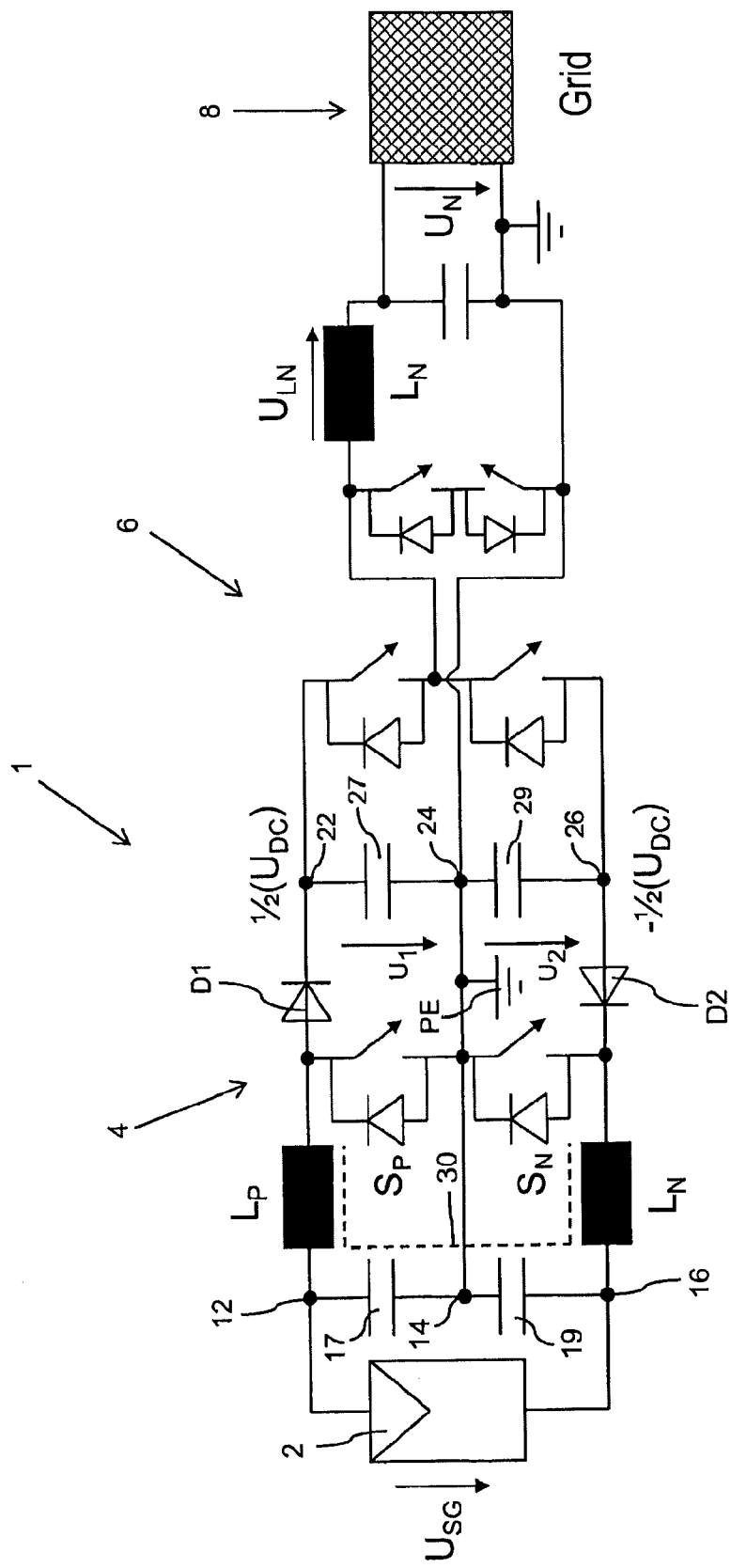
FIG. 2 shows a solar array having a solar generator, a step-up converter and an inverter according to one further specific embodiment.

FIG. 1 and, moreover, also FIG. 2 show a single-phase feed into the electrical grid 8. A three-phase feed may also be considered. Basically, this does not change the fundamental design of step-up converter 4 and of any other step-up converters described in this application.

Step-up converter 4 described is described in conjunction with solar array 1, but it may also be used in other applications. According to FIG. 1, solar generator 2 provides a solar generator voltage $U_{SG}$, which is present as an input voltage or input DC supply voltage between positive input node 12 and negative input node 16. In this configuration, this input voltage is present across the entire input capacitor means 18. From this, step-up converter 4 generates an output voltage, namely an intermediate circuit voltage $U_{DC}$ which is present between positive output node 22 and negative output node 26. For purposes of illustration, in FIG. 1 it is assumed for simplicity's sake that a voltage potential of ½ $U_{DC}$ is present at the positive output node and, similarly, a voltage potential of ½ $U_{DC}$ is present at negative output node 26. This represents the symmetrical case or the balanced case. As described above, however, it is possible according to an advantageous activation to provide a different voltage in this case. A first partial output voltage $U_1$ is present across first output capacitor means 27, namely the first intermediate circuit capacitor, and a second partial output voltage $U_2$ is present across second output capacitor means 29, namely the second intermediate circuit capacitor. First and second intermediate circuit capacitors 27, 29 are connected to one another via center output node 24.

Positive output node 22 and negative output node 26, as well as center output node 24 may be considered to be output connections of step-up converter 4, and the other elements shown to the right as seen in the representation of FIG. 1 are part of inverter 6 and therefore require no further elaboration. In principle, the DC supply voltage intermediate circuit, i.e., positive output node 22, negative output node 26 and center output node 24 with intermediate circuit capacitors 27 and 29 situated in between may be considered part of inverter 6. Preferably, inverter 6 and step-up converter 4 are merged into one circuit so that the specific allocation of the aforementioned elements does not occur.

Step-up converter 4 includes a first or positive inductor $L_P$, which is situated between first positive input node 12 and positive output node 22. In addition, a first diode D1 is also provided in this positive branch. Connected between first inductor $L_P$ and first diode D1 is a switching means Sp, which is also connected to center output node 24. The first switching means or positive switching means Sp includes a switch having a parallel diode.

Similarly, provided in the negative branch is a second or negative inductor $L_N$ and it is connected via second diode D2 between negative output node 26 and negative input node 16. In addition, it is connected via a second or negative switching means $S_N$ composed of a switch and a parallel diode, to center output node 24. Center output node 24 is also connected to ground or to PE.

The first and second inductor or positive and negative inductor $L_P$ and $L_N$ are inductively coupled to one another, as illustrated by a coupling 30 in FIG. 1.

Step-up converter 4 shown constitutes a three-point step-up converter having two upstream inductors $L_P$, $L_N$ which are coupled to a core, as indicated by coupling 30. At this point it is generally noted that the step-up converter described in the application may in principle also be referred to as a three-point step-up converter. It steps up a voltage from the voltage input to the voltage output, three voltage potentials being present at the voltage output, namely, at the positive and negative output nodes and at the center output node, which may be targeted by the step-up converter.

In particular, it is noted with regard to FIG. 1 that on the grid side, i.e., toward grid 8, the circuit shown is coupled via a three-point inverter 6 to grid 8. The former may also be designed as two- or three-phased.

Solar generator voltage $U_{SG}$ may be stepped up to intermediate circuit voltage $U_{DC}$ with the aid of alternating clocking of switching means $S_P$ and $S_N$ at a correspondingly high input voltage, namely if the solar generator voltage $U_{SG}$ is higher than $U_{DC}/2$. The advantageous effect is that a counter voltage $U_{DC}/2$ is present when inductors $L_N$ and $L_P$ are magnetized and a current ripple is reduced as a result. A further advantage is the reciprocal clocking of $S_N$ and $S_P$, as a result of which the visible switching frequency at the inductors is doubled. Namely, in each case both the direct electrical circuit and the circuit at the respective other inductor which operates via the inductive coupling become visible at inductors $L_P$ and $L_N$. The two cited effects may be utilized for significantly reducing the total inductivity of inductors $L_P$ and $L_N$ over a comparable conventional step-up converter approach. The reduction may at times be at least 50%.

At low input voltages, i.e., when solar generator voltage $U_{SG}$ is lower than $U_{DC}/2$, the switching states are changed to the extent that both switching means $S_P$ and $S_N$ are temporarily closed at the same time. Thus, second switching means $S_N$ closes while first switching means Sp is still closed, and vice versa. That applies, in principle, for each switching cycle. At high input voltages both switching means $S_P$, $S_N$ may be temporarily opened at the same time. Thus, second switching means $S_N$ opens after first switching means Sp has already opened. In both cases, a reduction in current ripple and doubling of visible switching frequency may be achieved.

A further advantage lies in the possibility of balancing the intermediate circuit, namely the two intermediate circuit capacitors 27 and 29 when the load of the intermediate circuit is unbalanced, through differing pulse duty factors of the switching means $S_P$ and $S_N$ from the solar generator side, i.e., originating from the input side of step-up converter 4, i.e., to counteract an unequal loading. In this way a balancing on the inverter side or by the inverter may be avoided or, if necessary, supplemented. As a result of this advantage, the circuit, namely in particular step-up converter 4, is particularly suited for isolated operation, in which unbalanced loads in particular may be expected.

The design of solar array 1 according to FIG. 2 differs from that of FIG. 1 essentially in that composite capacitor means 18 of FIG. 1, i.e., input capacitor 18 of FIG. 1 is split in the design in FIG. 2 and, accordingly, includes a first and second input capacitor means 17, 19, which may also be referred to as first and second input capacitors 17, 19. First and second input capacitors 17, 19 are connected in series between positive input node 12 and negative input node 16 and are connected to one another via center input node 14. Center input node 14 is electrically connected to center output node 24. Both nodes are grounded or connected to PE.

The specific embodiment of FIG. 2 is therefore similar to that of FIG. 1. In FIG. 2 the DC input connections, namely positive and negative input nodes 12, 16 are permanently coupled to PE by two capacitors, namely first and second capacitors 17, 19. This leads sometimes to a significant reduction in operation-related leakage currents. A coupling of the upper and lower converter is the result of the inductive coupling of inductors $L_P$, $L_N$. The upper converter may be understood to mean the part of step-up converter 4 which includes first input capacitor 17, first inductor $L_P$, first switching means $S_P$, first diode D1 and first intermediate circuit capacitor 27.

Similarly, a lower converter is formed from the elements of second input capacitor 19, second inductor $L_N$, second switching means $S_N$, second diode D2 and second intermediate circuit capacitor 29.

The possibility of exchanging energy of the upper input capacitor, that is, first input capacitor 17 with the lower intermediate circuit capacitor, i.e., second intermediate circuit capacitor 29, and vice versa is presented via the coupling of the inductors, i.e., inductive coupling 30. Solar generator 2 in this case is capacitively coupled to ground via the two capacitors, namely first and second input capacitors 17 and 19 and via center input nodes 14. In this way, operation-related leakage currents are avoided.

Figure 3:
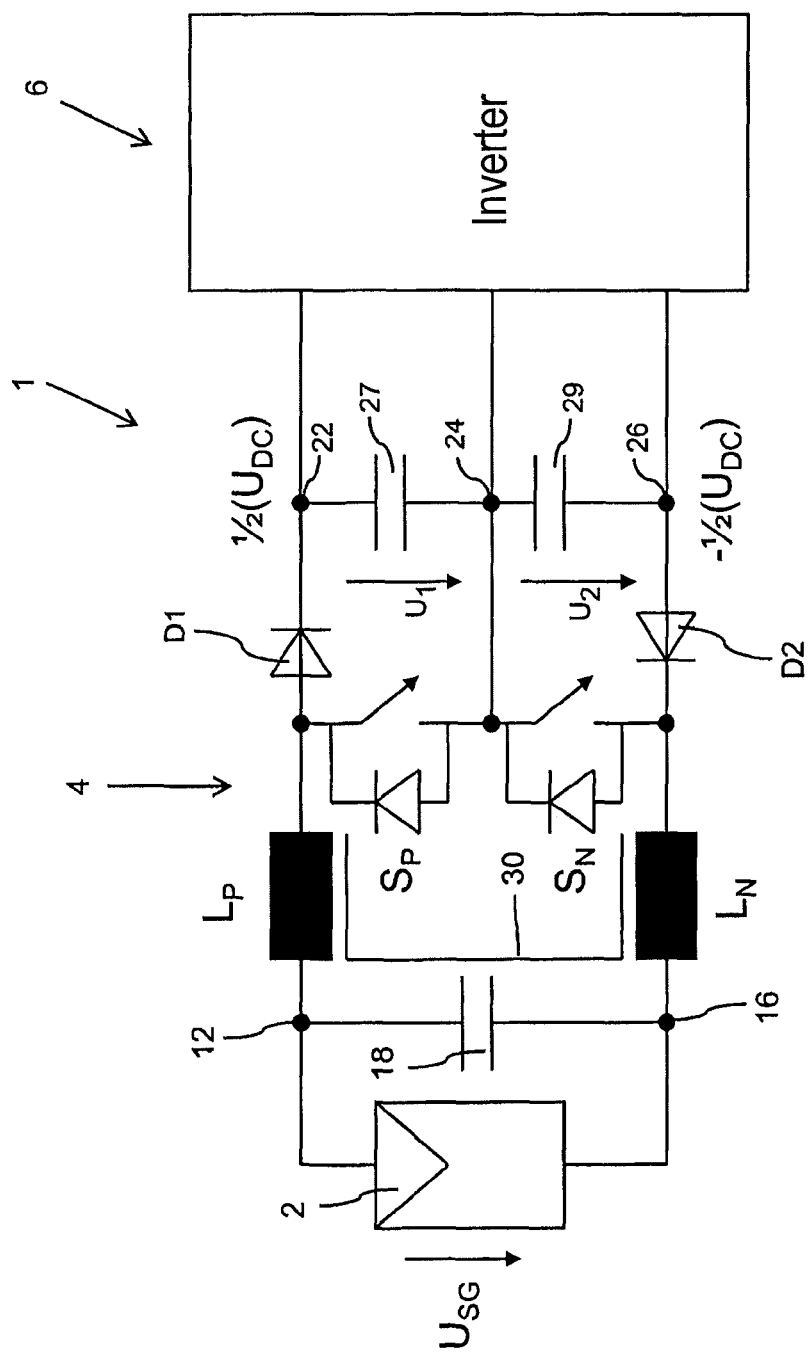
FIG. 3 shows a solar array having a solar generator, a step-up converter and an inverter according to one further specific embodiment.
Figure 4:
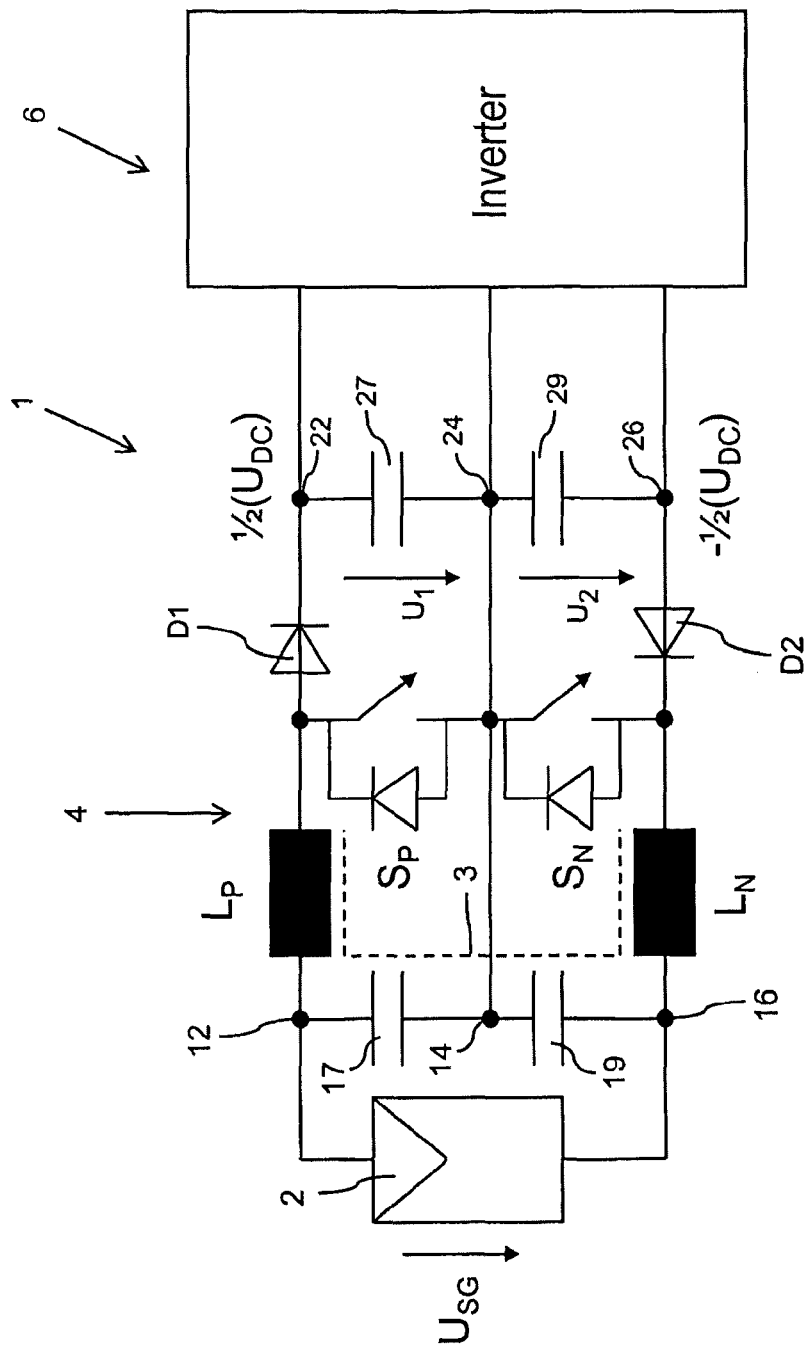
FIG. 4 shows a solar array having a solar generator, a step-up converter and an inverter according to one further specific embodiment.

The specific embodiments of FIGS. 3 and 4 each correspond generally to the specific embodiments of FIGS. 1 and 2. However, the specific embodiments of FIGS. 3 and 4 merely illustrate inverter 6 and, in addition, each show—this applies to both specific embodiments of FIGS. 3 and 4—a variant without the coupling of center output node 24 to ground or to PE.

A method is also provided in which intermediate circuit halves are deliberately asymmetrically charged by the step-up converter defined by Sp and Sn. Adjusting the intermediate circuit in this way, i.e., the voltage at the output capacitor means of each half wave of the grid, results in a reduction in switching losses of the downstream inverter. Moreover, the total intermediate circuit voltage may be reduced. Such adjustment is particularly advantageous with single-phase inverters, but improvements may be made in the case of three-phase inverters as well.

What is claimed is:

1. A step-up converter to step up an electrical input DC supply voltage to an electrical output DC supply voltage, comprising:

a voltage input having a positive input node and a negative input node to apply the input DC supply voltage;

a voltage output having a positive output node and a negative output node to provide the output DC supply voltage;

a first and a second output capacitor which are connected in series at the voltage output between the positive and negative output nodes and are connected to one another via a center output node;

a first inductor connected between the positive input node and the positive output node;

a first switch connected between the first inductor and the center output node and configured for clocked switching for stepping up the input voltage in conjunction with the first inductor;

a second inductor connected between the negative output node and the negative input node;

a second switch connected between the center output node and the second inductor and configured for clocked switching for stepping up the input voltage in conjunction with the second inductor; and a total input capacitor connected at the voltage input between the positive and negative input voltage nodes, for picking up and smoothing the input voltage, the first and second inductors being inductively coupled to one another;

wherein the first and second switches are configured for reciprocal clocking of the first and second switches to reciprocally step up a first and second partial output voltage on the first and second output capacitors, and wherein the first and second switches are configured for reciprocal clocking in such a way that (i) both of the first and second switches are temporarily opened at the same time when the input DC supply voltage is higher than half of a nominal voltage of the output voltage, and (ii) both of the first and second switches are temporarily closed at the same time when the input DC supply voltage is lower than half of a nominal voltage of the output voltage.

2. The step-up converter as recited in claim 1, wherein the total input capacitor includes a first and a second input capacitor, which are connected in series at the voltage input between the positive and negative input voltage nodes and are connected to one another via a center input node, and the center input node and the center output node being connected to one another.

3. The step-up converter as recited in claim 1, wherein the center output node is grounded.

4. The step-up converter as recited in claim 1, wherein at least one of: i) the first and second output capacitors are the same size, ii) the first and second inductors are the same size, and iii) the first and second input capacitor means are the same size.

5. An inverter assembly for generating an electrical AC current from an electrical DC supply voltage, comprising:
a step-up converter to step up an electrical input DC supply voltage to an output DC supply voltage including a voltage input having a positive input node and a negative input node to apply the input DC supply voltage, a voltage output having a positive output node and a negative output node to provide the output DC supply voltage, a first and a second output capacitor which are connected in series at the voltage output between the positive and negative output nodes and are connected to one another via a center output node, a first inductor connected between the positive input node and the positive output node, a first switch connected between the first inductor and the center output node and configured for clocked switching for stepping up the input voltage in conjunction with the first inductor, a second inductor connected between the negative output node and the negative input node, a second switch connected between the center output node and the second inductor and configured for clocked switching for stepping up the input voltage in conjunction with the second inductor, and a total input capacitor connected at the voltage input between the positive and negative input voltage nodes, for picking up and smoothing the input voltage, the first and second inductors being inductively coupled to one another, wherein the first and second switches are configured for reciprocal clocking of the first and second switches to reciprocally step up a first and second partial output voltage on the first and second output capacitors, and wherein the first and second switches are configured for reciprocal clocking in such a way that (i) both of the first and second switches are temporarily opened at the same time when the input DC supply voltage is higher than half of a nominal voltage of the output voltage, and (ii) both of the first and second switches are temporarily closed at the same time when the input DC supply voltage is lower than half of a nominal voltage of the output voltage; and
an inverter to generate an electrical AC voltage from the output DC supply voltage of the step-up converter.

6. The inverter assembly as recited in claim 5, wherein the output DC supply voltage of the step-up converter forms an intermediate current voltage, and an input voltage of the inverter and the first and second output capacitors form a first and second intermediate circuit capacitor.

7. A solar array, comprising:
a solar generator to generate electrical energy from light and to provide an electrical DC supply voltage; and
an inverter assembly to generate an electrical AC current from the DC supply voltage provided by the solar generator, the inverter assembly including a step-up converter to step up the DC supply voltage from the solar generator to an output DC supply voltage including a voltage input having a positive input node and a negative input node to apply the DC supply voltage from the solar generator, a voltage output having a positive output node and a negative output node to provide the output DC supply voltage, a first and a second output capacitor which are connected in series at the voltage output between the positive and negative output nodes and are connected to one another via a center output node, a first inductor connected between the positive input node and the positive output node, a first switch connected between the first inductor and the center output node and configured for clocked switching for stepping up the input voltage in conjunction with the first inductor, a second inductor connected between the negative output node and the negative input node, a second switch connected between the center output node and the second inductor and configured for clocked switching for stepping up the input voltage in conjunction with the second inductor, and a total input capacitor connected at the voltage input between the positive and negative input voltage nodes, for picking up and smoothing the input voltage, the first and second inductors being inductively coupled to one another, and further including an inverter to generate an electrical AC voltage from the output DC supply voltage of the step-up converter, wherein the first and second switches are configured for reciprocal clocking of the first and second switches to reciprocally step up a first and second partial output voltage on the first and second output capacitors, and wherein the first and second switches are configured for reciprocal clocking in such a way that (i) both of the first and second switches are temporarily opened at the same time when the input DC supply voltage is higher than half of a nominal voltage of the output voltage, and (ii) both of the first and second switches are temporarily closed at the same time when the input DC supply voltage is lower that half of a nominal voltage of the output voltage.

8. A method for operating a step-up converter, comprising:
providing a step-up converter to step up an electrical input DC supply voltage to an electrical output DC supply voltage, the step-up converter including a voltage input having a positive input node and a negative input node to apply the input DC supply voltage, a voltage output having a positive output node and a negative output node to provide the output DC supply voltage, a first and a second output capacitor which are connected in series at the voltage output between the positive and negative output nodes and are connected to one another via a center output node, a first inductor connected between the positive input node and the positive output node, a first switch connected between the first inductor and the center output node and configured for clocked switching for stepping up the input voltage in conjunction with the first inductor, a second inductor connected between the negative output node and the negative input node, a second switch connected between the center output node and the second inductor for and configured clocked switching for stepping up the input voltage in conjunction with the second inductor, and a total input capacitor connected at the voltage input between the positive and negative input voltage nodes, for picking up and smoothing the input voltage, the first and second inductors being inductively coupled to one another; and reciprocally clocking the first and second switches to reciprocally step up a first and second partial output voltage on the first and second output capacitors, wherein the reciprocal clocking of the first and second switch is performed in such a way that both of the first and second switches are temporarily opened at the same time when the input DC supply voltage is higher than half of a nominal voltage of the output voltage, and the reciprocal clocking of the first and second switches is performed in such a way that both of the first and second switches are temporarily closed at the same time when the input DC supply voltage is lower than half of a nominal voltage of the output voltage.

9. The method as recited in claim 8, wherein the step-up converter is operated in such a way that the first and the second output capacitors are one of continuously or cyclically unequally charged.

10. The method as recited in claim 8, wherein the step-up converter is activated in such a way that the first and second partial output voltages fluctuate counter to one another to adjust their amplitudes to an AC voltage to be generated, the partial output voltages fluctuating in such a way that their sum remains approximately constant.

* * * * *